(12) United States Patent
Trita

(10) Patent No.: US 10,955,613 B2
(45) Date of Patent: Mar. 23, 2021

(54) ARRAYED WAVEGUIDE GRATING WITH FREE PROPAGATION REGION MATCHING

(71) Applicant: ROCKLEY PHOTONICS LIMITED, London (GB)

(72) Inventor: Andrea Trita, Pasadena, CA (US)

(73) Assignee: Rockley Photonics Limited, Oxford (GB)

( * ) Notice: Subject to any disclaimer, the term of this patent is extended or adjusted under 35 U.S.C. 154(b) by 0 days.

(21) Appl. No.: 16/523,987

(22) Filed: Jul. 26, 2019

(65) Prior Publication Data
US 2019/0346622 A1 Nov. 14, 2019

Related U.S. Application Data

(63) Continuation-in-part of application No. 15/643,399, filed on Jul. 6, 2017, now Pat. No. 10,488,589.

(60) Provisional application No. 62/456,613, filed on Feb. 8, 2017.

(51) Int. Cl.
*G02B 6/12* (2006.01)

(52) U.S. Cl.
CPC ...... *G02B 6/12011* (2013.01); *G02B 6/12009* (2013.01); *G02B 6/12014* (2013.01); *G02B 6/12028* (2013.01); *G02B 6/12033* (2013.01)

(58) Field of Classification Search
CPC .................................................. G02B 6/12011
See application file for complete search history.

(56) References Cited

U.S. PATENT DOCUMENTS

| 5,515,460 | A  | 5/1996  | Stone          |
|-----------|----|---------|----------------|
| 5,661,825 | A  | 8/1997  | Van Dam et al. |
| 5,694,496 | A  | 12/1997 | Ando et al.    |
| 5,793,907 | A  | 8/1998  | Jalali et al.  |
| 5,901,259 | A  | 5/1999  | Ando et al.    |
| 6,072,920 | A  | 6/2000  | Ando et al.    |
| 6,141,467 | A  | 10/2000 | Doerr          |
| 6,212,323 | B1 | 4/2001  | Harpin et al.  |

(Continued)

FOREIGN PATENT DOCUMENTS

| CA | 2 275 800 A1 | 12/2000 |
|----|--------------|---------|
| EP | 0 826 989 A2 | 3/1998  |

(Continued)

OTHER PUBLICATIONS

Cocorullo, G. et al., "Measurement of the thermo-optic coefficient of a-Si:H at the wavelength of 1500 nm from room temperature to 200 ° C.", Journal of Non-Crystalline Solids, 2002, pp. 310-313, Elsevier Science B.V.

(Continued)

*Primary Examiner* — Omar R Rojas
(74) *Attorney, Agent, or Firm* — Lewis Roca Rothgerber Christie LLP

(57) ABSTRACT

An arrayed waveguide grating. The arrayed waveguide grating includes two star couplers and an array of waveguides connecting the star couplers. The T-shaped geometry of the array of waveguides makes possible an AWG with an arbitrarily large free spectral range in a compact form factor. An array mode converter produces a field pattern, at an aperture of a free propagation region of a star coupler, having overlapping modes from adjacent waveguides.

18 Claims, 13 Drawing Sheets

(56) References Cited

U.S. PATENT DOCUMENTS

| | | | | |
|---|---|---|---|---|
| 6,304,706 | B1* | 10/2001 | Sugita | G02B 6/12011 385/129 |
| 6,921,490 | B1* | 7/2005 | Qian | G02B 6/12011 216/24 |
| 7,049,004 | B2 | 5/2006 | Domash et al. | |
| 7,174,063 | B2 | 2/2007 | Doerr et al. | |
| 7,382,953 | B1 | 6/2008 | Bulthuis et al. | |
| 7,492,988 | B1 | 2/2009 | Nordin et al. | |
| 8,873,910 | B2 | 10/2014 | Bulthuis et al. | |
| 9,366,819 | B1 | 6/2016 | Bauters et al. | |
| 2002/0122651 | A1 | 9/2002 | Roberts | |
| 2003/0072009 | A1 | 4/2003 | Domash et al. | |
| 2003/0123799 | A1 | 7/2003 | Lazaro Villa | |
| 2003/0161579 | A1 | 8/2003 | Yan et al. | |
| 2004/0101239 | A1 | 5/2004 | Parker | |
| 2007/0160326 | A1 | 7/2007 | Kwakernaak et al. | |
| 2011/0142396 | A1 | 6/2011 | Okamoto | |
| 2011/0164879 | A1 | 7/2011 | Vasilyev et al. | |
| 2011/0229080 | A1 | 9/2011 | Bulthuis et al. | |
| 2013/0243383 | A1 | 9/2013 | Agarwal et al. | |
| 2013/0308904 | A1 | 11/2013 | McGinnis et al. | |
| 2014/0376861 | A1 | 12/2014 | Nakamura et al. | |
| 2015/0309252 | A1 | 10/2015 | Kato et al. | |
| 2017/0023736 | A1 | 1/2017 | Bauters et al. | |
| 2017/0090122 | A1 | 3/2017 | Kato | |

FOREIGN PATENT DOCUMENTS

| | | |
|---|---|---|
| EP | 1 191 363 A1 | 3/2002 |
| EP | 1 319 967 A1 | 6/2003 |
| EP | 1 698 922 A2 | 9/2006 |
| GB | 2 334 594 A | 8/1999 |
| JP | 7-104137 A | 4/1995 |
| WO | WO 2014/060648 A1 | 4/2014 |

OTHER PUBLICATIONS

Fukazawa, Tatsuhiko et al., "Very Compact Arrayed-Waveguide-Grating Demultiplexer Using Si Photonic Wire Waveguides", Japanese Journal of Applied Physics, Apr. 28, 2004, 4 pages, vol. 43, No. 5B, The Japan Society of Applied Physics.

International Search Report and Written Opinion of the International Searching Authority, dated Jul. 19, 2018, corresponding to PCT/EP2018/053219, 19 pages.

International Search Report and Written Opinion of the International Searching Authority, dated Nov. 26, 2018, Corresponding to PCT/IB2018/000916, 12 pages.

Iodice, M. et al., "Thermo-optical static and dynamic analysis of a digital optical switch based on amorphous silicon waveguide", Optics Express, Jun. 12, 2006, pp. 5266-5278, vol. 14, No. 12, Optical Society of America.

Kamei, Shin, "Recent Progress on Athermal AWG Wavelength Multiplexer", 2009, 3 pages, Optical Society of America.

Lycett, Richard J. et al., "Perfect Chirped Echelle Grating Wavelength Multiplexor: Design and Optimization", IEEE Photonics Journal, Apr. 2013, 24 pages, vol. 5, No. 2, IEEE Photonics Society.

Madsen, Christi K., et al., "Chapter 4: Multi-Stage MA Architectures", Optical Filter Design and Analysis: A Signal Processing Approach, 1999, pp. 165-236, John Wiley & Sons, Inc.

Partial Search Report of the International Searching Authority, dated May 8, 2018, Corresponding to PCT/EP2018/053219, 11 pages.

Pathak, Shibnath, "Silicon Nano-Photonics based Arrayed Waveguide Gratings", IMEC, Mar. 2014, pp. 1-75, Universiteit Gent.

Pathak. S et al., "Comparison of AWGs and Echelle Gratings for Wavelength Division Multiplexing on Silicon-on-Insulator", IEEE Photonics Journal, Oct. 2014, 10 pages, vol. 6, No. 5.

Takei, Ryohei et al., "Sub-1 dB/cm submicrometer-scale amorphous silicon waveguide for backend on-chip optical interconnect", Optics Express, Feb. 24, 2014, pp. 4779-4788, vol. 22, No. 4, Optical Society of America.

Trita, Andrea et al., "Simultaneous Interrogation of Multiple Fiber Bragg Grating Sensors Using an Arrayed Waveguide Grating Filter Fabricated in SOI Platform", IEEE Photonics Journal, Dec. 2015, 12 pages, vol. 7, No. 6, IEEE Photonics Society.

U.K. Intellectual Property Office Combined Search and Examination Report, dated Aug. 8, 2018, for Patent Application No. GB 1802072.7, 8 pages.

U.K. Intellectual Property Office Examination Report, dated Sep. 18, 2019, for Patent Application No. GB 1802072.7, 4 pages.

U.S. Appl. No. 15/643,399, filed Jul. 6, 2017.

U.S. Appl. No. 16/036,866, filed Jul. 16, 2018.

U.S. Appl. No. 16/088,387, filed Sep. 25, 2018.

U.S. Office Action dated Jan. 3, 2019, for U.S. Appl. No. 15/643,399, 14 pages.

U.S. Office Action dated Apr. 4, 2019, for U.S. Appl. No. 16/036,866, 9 pages.

U.S. Office Action dated May 9, 2019, for U.S. Appl. No. 15/643,399, 11 pages.

U.S. Office Action dated Nov. 12, 2019, for U.S. Appl. No. 16/088,387, 12 pages.

U.S. Office Action dated Dec. 12, 2019, for U.S. Appl. No. 16/036,866, 15 pages.

U.S. Appl. No. 16/816,142, filed Mar. 11, 2020.

U.S. Office Action from U.S. Appl. No. 16/088,387, dated Feb. 12, 2020, 9 pages.

U.S. Office Action from U.S. Appl. No. 16/088,387, dated Apr. 30, 2020, 9 pages.

U.S. Office Action from U.S. Appl. No. 16/088,387, dated Oct. 8, 2020, 12 pages.

Zirngibl, M. et al., "Demonstration of a 15x15 Arrayed Wavegiude Multiplexer on InP", IEEE Photonics Technology Letters, Nov. 1992, pp. 1250-1253, vol. 4, No. 11, IEEE.

* cited by examiner

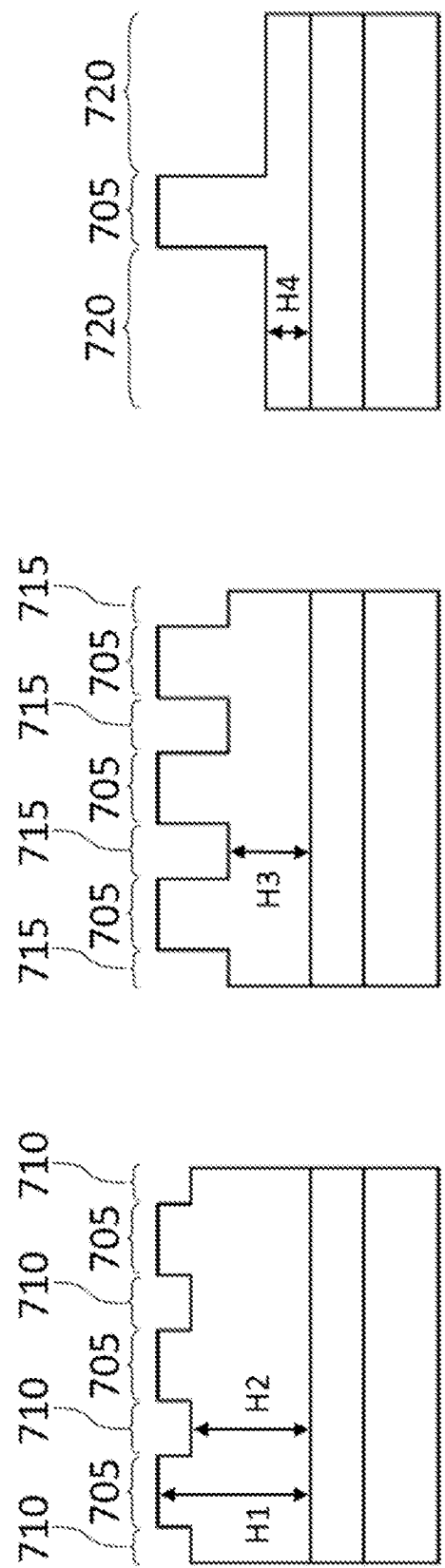

ARRAYED WAVEGUIDE GRATING WITH FREE PROPAGATION REGION MATCHING

CROSS-REFERENCE TO RELATED APPLICATION(S)

The present application is a continuation-in-part of U.S. patent application Ser. No. 15/643,399, filed Jul. 6, 2017, entitled "T-SHAPED ARRAYED WAVEGUIDE GRATING", which claims priority to and the benefit of U.S. Provisional Application No. 62/456,613, filed Feb. 8, 2017, entitled "T-SHAPED ARRAYED WAVEGUIDE GRATING", the entire contents of both which are incorporated herein by reference.

FIELD

One or more aspects of embodiments according to the present invention relate to arrayed waveguide gratings, and more particularly to an improved arrayed waveguide grating design.

BACKGROUND

Arrayed waveguide gratings (AWGs) may be used in various applications, to route light according to its wavelength. Rectangular AWGs may have various favorable characteristics, including compactness, but the number of channels and the channel spacing achievable with such devices may be limited by constraints on the transverse separation between waveguides of the array.

Thus, there is a need for an improved arrayed waveguide grating design.

SUMMARY

Aspects of embodiments of the present disclosure are directed toward an arrayed waveguide grating. The arrayed waveguide grating includes two star couplers and an array of waveguides connecting the star couplers. The T-shaped geometry of the array of waveguides makes possible to achieve an AWG with an arbitrarily large free spectral range in a compact form factor.

According to some embodiments of the present invention there is provided an array mode converter for coupling to a free propagation region of a star coupler, the array mode converter including: a high-index layer on a low-index layer, the high-index layer having: a first region, having a first height above the low-index layer; a second region, having a second height above the low-index layer, the second height being less than the first height; and a third region, having a third height above the low-index layer, the third height being less than the second height, the first region, the second region, and the third region defining a first waveguide and a second waveguide, the first waveguide having a sidewall height decreasing, with decreasing distance, along the first waveguide, from the free propagation region, to a sidewall height of less than 1.2 microns at the free propagation region.

In some embodiments, a trench width between the first waveguide and the second waveguide, at the free propagation region, is less than 1.5 microns.

In some embodiments, a trench width between the first waveguide and the second waveguide, at the free propagation region, is less than 0.7 microns.

In some embodiments, the first region has a height, above the low-index layer, that is within 20% of 3.0 microns.

In some embodiments, the second region has a height, above the low-index layer, that is less than the height, above the low-index layer, of the first region, by an amount that is within 20% of 0.6 microns.

In some embodiments, the third region has a height that is within 20% of 1.8 microns.

In some embodiments, the second region forms a slab on both sides of the first waveguide, the slab having a width, on each side of each sidewall of the first waveguide, tapering, at a taper angle, in a direction, along the first waveguide, of increasing distance from the free propagation region, from a width of more than three microns to a width of less than 0.5 microns, the taper angle being, at a point along the length of the slab, less than 2 degrees.

In some embodiments, the taper angle is, at a point along the length of the slab, less than 1 degree.

In some embodiments, the array mode converter further includes a fourth region, having a fourth height above the low-index layer, the fourth height being less than the third height.

In some embodiments, the fourth height is greater than or equal to zero microns and less than 0.5 microns.

According to some embodiments of the present invention there is provided an array mode converter for coupling to a free propagation region of a star coupler, the array mode converter including: a high-index layer on a low-index layer, the high-index layer having: a first region, having a first height above the low-index layer; a second region, having a second height above the low-index layer, the second height being less than the first height; and a third region, having a third height above the low-index layer, the third height being less than the second height, the first region, the second region, and the third region defining: an array of first waveguides terminating at a first aperture of the star coupler, each of the first waveguides having a fundamental transverse electric mode and defining a first field pattern at the first aperture of the star coupler, and a second waveguide, terminating at a second aperture of the star coupler and having a fundamental transverse electric mode defining a second field pattern at the first aperture of the star coupler, an overlap integral of the first field pattern with the second field pattern over the first aperture of the star coupler being at least 0.8 times as great as an overlap integral of the first field pattern with the first field pattern.

In some embodiments, each of the first waveguides includes a shallow rib mode converter forming a transition between a first rib waveguide section and second rib waveguide section, the second rib waveguide section being nearer the star coupler than the first rib waveguide section and having a rib height less than a rib height of the first rib waveguide section.

In some embodiments, the shallow rib mode converter is capable of transforming a fundamental transverse electric mode of the first rib waveguide section to a fundamental transverse electric mode of the second rib waveguide section with a loss of less than 0.5 dB.

According to some embodiments of the present invention there is provided an arrayed waveguide grating, including: a first star coupler, a second star coupler, an array of waveguides connecting the first star coupler and the second star coupler, and an array mode converter, in the array of waveguides, at the first star coupler, each of the waveguides having four bends, each of the bends having a change of direction of at least 80 degrees, wherein a first waveguide of the array of waveguides has, along the first waveguide in a direction from the first star coupler to the second star coupler: a first clockwise bend, a first counterclockwise bend following the first clockwise bend, a second counterclockwise bend following the first counterclockwise bend, and a second clockwise bend following the second counterclockwise bend, and wherein the array mode converter includes: a high-index layer on a low-index layer, the high-index layer having: a first region, having a first height above the low-index layer; a second region, having a second height above the low-index layer, the second height being less than the first height; and a third region, having a third height above the low-index layer, the third height being less than the second height, a first waveguide of the array of waveguides having, within the array mode converter, a sidewall height decreasing, with decreasing distance, along the first waveguide, from a free propagation region of the first star coupler, to a sidewall height of less than 1.2 microns at the free propagation region of the first star coupler.

In some embodiments, a trench width between the first waveguide and a second waveguide of the array of waveguides, at the free propagation region of the first star coupler, is less than 0.7 microns.

In some embodiments, the second region has a height, above the low-index layer, that is less than the height, above the low-index layer, of the first region, by an amount that is within 20% of 0.6 microns.

In some embodiments, the second region forms a slab on both sides of the first waveguide, the slab having a width, on each side of each sidewall of the first waveguide, tapering, at a taper angle, in a direction, along the first waveguide, of increasing distance from the free propagation region of the first star coupler, from a width of more than three microns to a width of less than 0.5 microns, the taper angle being, at a point along the length of the slab, less than 2 degrees.

In some embodiments, the taper angle is, at a point along the length of the slab, less than 1 degree.

In some embodiments, the array mode converter further includes a fourth region, having a fourth height, above the low-index layer, the fourth height being less than the third height.

In some embodiments, the fourth height is greater than or equal to zero microns and less than 0.5 microns.

BRIEF DESCRIPTION OF THE DRAWINGS

These and other features and advantages of the present invention will be appreciated and understood with reference to the specification, claims, and appended drawings wherein:

FIG. 8A is a schematic cross-sectional view of FIG. 7, along section line 8A-8A, according to an embodiment of the present invention;

FIG. 8B is a schematic cross-sectional view of FIG. 7, along section line 8B-8B, according to an embodiment of the present invention;

FIG. 8C is a schematic cross-sectional view of FIG. 7, along section line 8C-8C, according to an embodiment of the present invention;

DETAILED DESCRIPTION

The detailed description set forth below in connection with the appended drawings is intended as a description of exemplary embodiments of a T-shaped arrayed waveguide grating with free propagation region matching provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
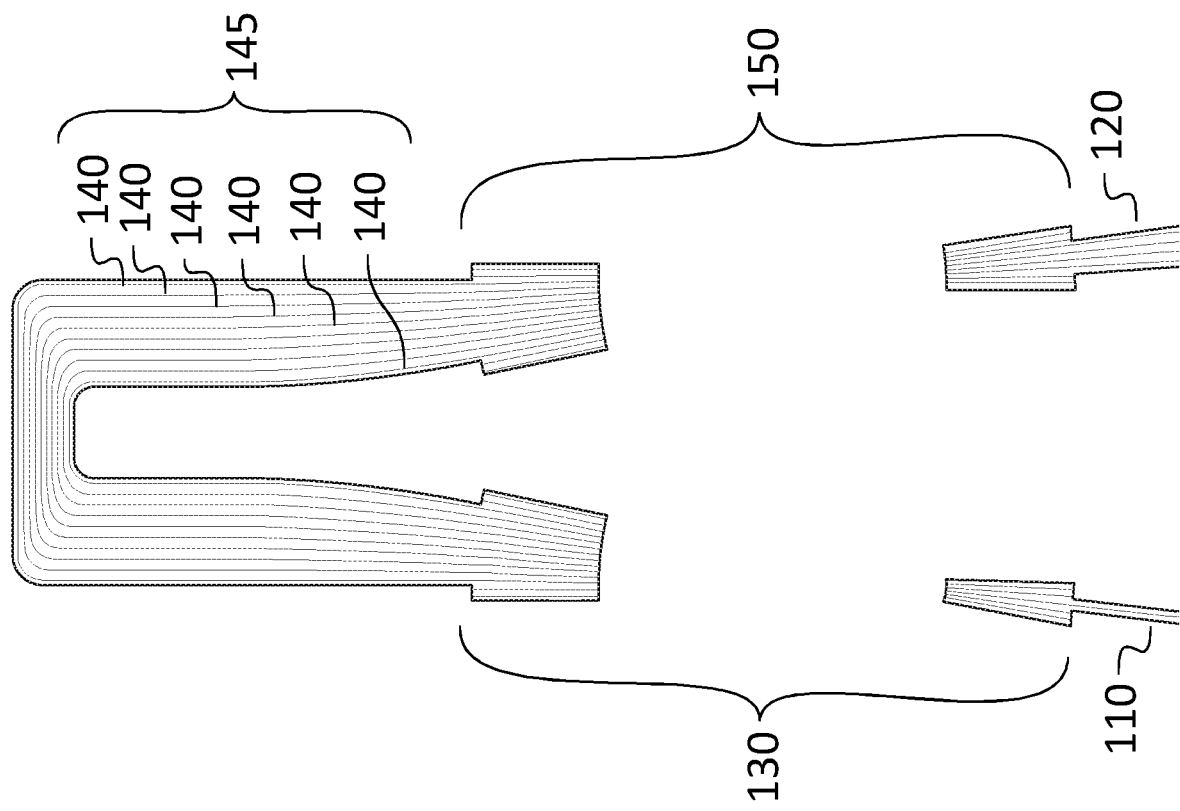
FIG. 1A is a plan view of a rectangular arrayed waveguide grating, according to an embodiment of the present invention.

Referring to FIG. 1A, in some embodiments a rectangular arrayed waveguide grating (AWG) may be used to direct light from an input waveguide 110 to one of a plurality of output waveguides 120 according to the wavelength of the light. Light from the input waveguide 110 illuminates, at a first star coupler 130, each waveguide 140 of an array 145 of waveguides 140, each of which has a different length. At a second star coupler 150, the light exiting the waveguides 140 may interfere constructively at one of the output waveguides 120.

The output waveguide at which the constructive interference occurs depends on the wavelength of the light; accordingly, a wavelength may be associated with each output waveguide 120. The wavelength (or frequency) difference between the wavelengths corresponding to two adjacent output waveguides is referred to herein as the "channel spacing". The AWG may be a reciprocal device, e.g., for light traveling in one direction through the AWG it may behave as a wavelength division multiplexing (WDM) multiplexer, and for light traveling in the opposite direction, it may behave as a WDM demultiplexer.

Figure 1B:
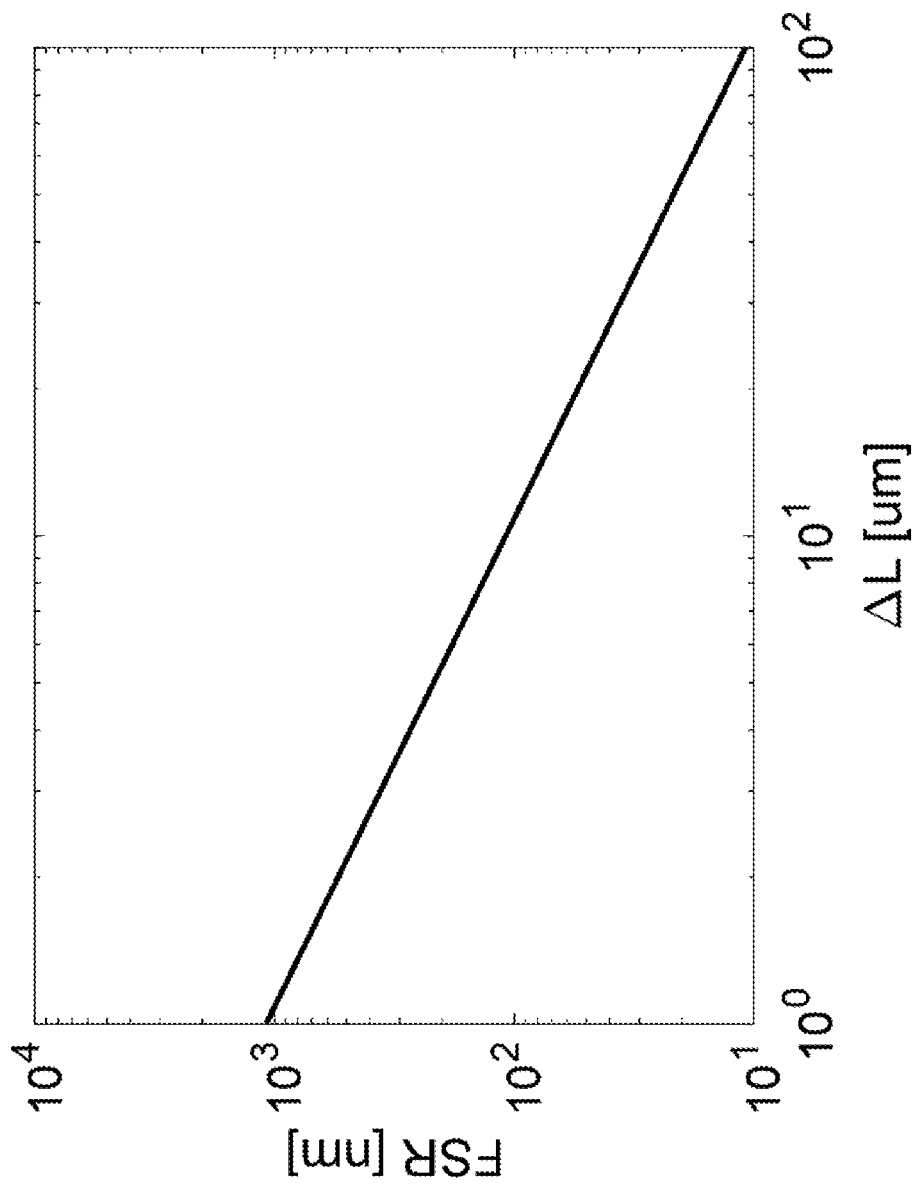
FIG. 1B is a graph of the free spectral range as a function of the incremental delay length, according to an embodiment of the present invention.
Figure 1C:
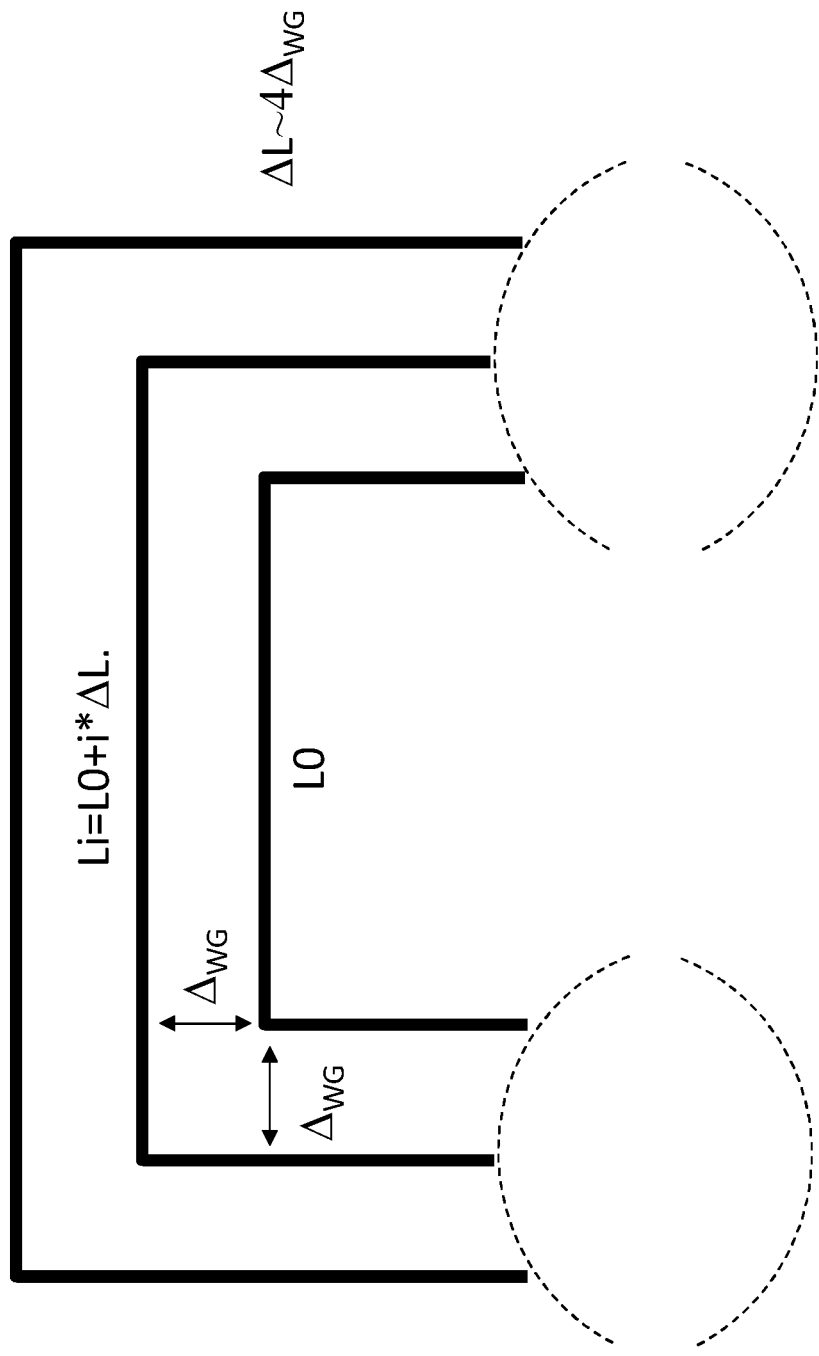
FIG. 1C is a schematic drawing of a rectangular arrayed waveguide grating, according to an embodiment of the present invention.

The free spectral range (FSR) of an AWG may be related to the incremental delay length (ΔL) of the waveguide array by the expression FSR=c/($n_g$ ΔL), where $n_g$ is the group index of the waveguide used in the waveguide array and depends on the fabrication platform, and c is the speed of light in vacuum. This expression is plotted in FIG. 1B in the case of a 3 um silicon on insulator (SOI) platform. The FSR of an AWG, on the other hand, may be larger or equal to the product $N_{Ch} \times Ch_{Spac}$, in order, for example, to have each channel within the range of interest univocally routed out of the corresponding output port of the AWG. A trade-off thus emerges between the product $N_{Ch} \times Ch_{Spac}$ and the incremental delay length (ΔL): a small incremental delay length (ΔL) may be used for an AWG with a large number of channels or a large channel spacing (or both). In the case of a rectangular AWG layout, the minimum incremental delay length (ΔL) may be constrained by the minimum transverse separation $\Delta_{WG}$ between the waveguides, which in turn may be constrained to prevent excessive mode overlap or physical overlapping of the waveguides (FIG. 1C). For this reason it may not be feasible to achieve more than 16 channels at a channel separation of 100 GHz, with a rectangular AWG layout fabricated on a 3 um SOI platform.

Figure 2B:
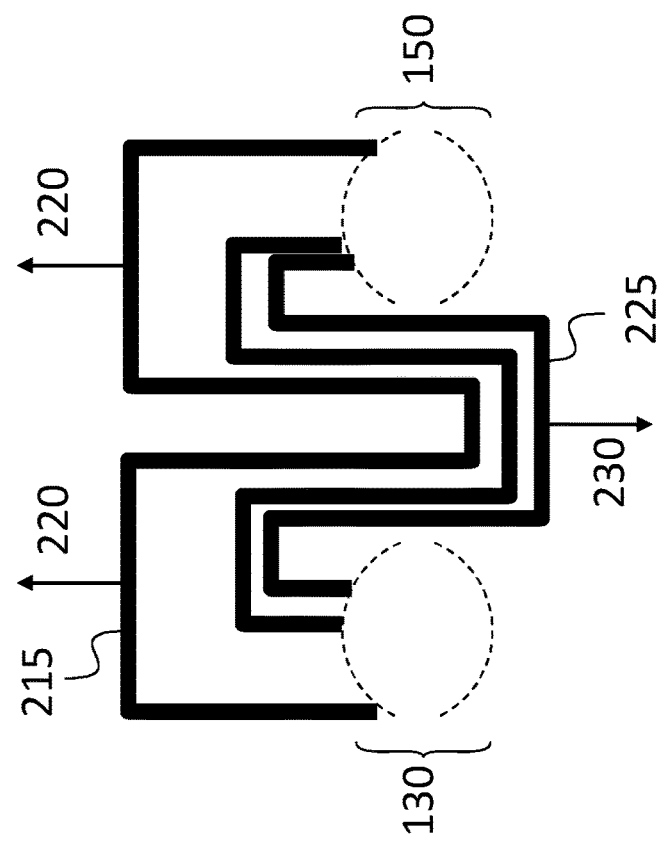
FIG. 2B is a schematic drawing of a T-shaped arrayed waveguide grating, according to an embodiment of the present invention.
Figure 2A:
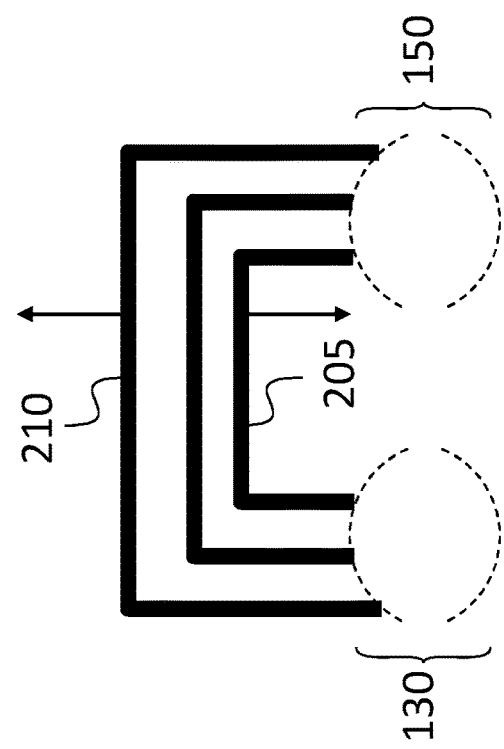
FIG. 2A is a schematic drawing of a rectangular arrayed waveguide grating, according to an embodiment of the present invention.

Referring to FIG. 2A, in a rectangular AWG design, the length difference between an innermost waveguide 205 of the array of waveguides and an outermost waveguide 210 of the array of waveguides may be adjusted by moving the respective horizontal portions up or down as shown by the arrows, but the minimum length difference that may be achieved is constrained if the waveguides 205, 210 are to avoid interfering with each other or with other waveguides that may exist between them.

By contrast, in the T-shaped array of waveguides of the AWG of FIG. 2B, the outermost waveguide 215 may be lengthened, without interfering with other waveguides of the array, by moving one or both of the upper horizontal portions upward (as shown by two upper arrows 220), and the innermost waveguide 225 may be lengthened, without interfering with other waveguides of the array, by moving the lower horizontal portion downward (as shown by the lower arrow 230). As such, the innermost waveguide 225 may be longer or shorter than the outermost waveguide 215, and the smallest length difference achievable is not affected by constraints on the minimum transverse separation between adjacent waveguides. Star couplers 130, 150 are shown schematically in FIGS. 2A and 2B. Moreover, the layout of the AWG of FIG. 2B facilitates the inclusion of a relatively large number waveguides in the array. The ability to include a relatively large number of waveguides may be advantageous in AWG designs in which the number of waveguides in the array is 3-6 times the greater of (i) the number of input channels and (ii) the number of output channels.

Figure 3:
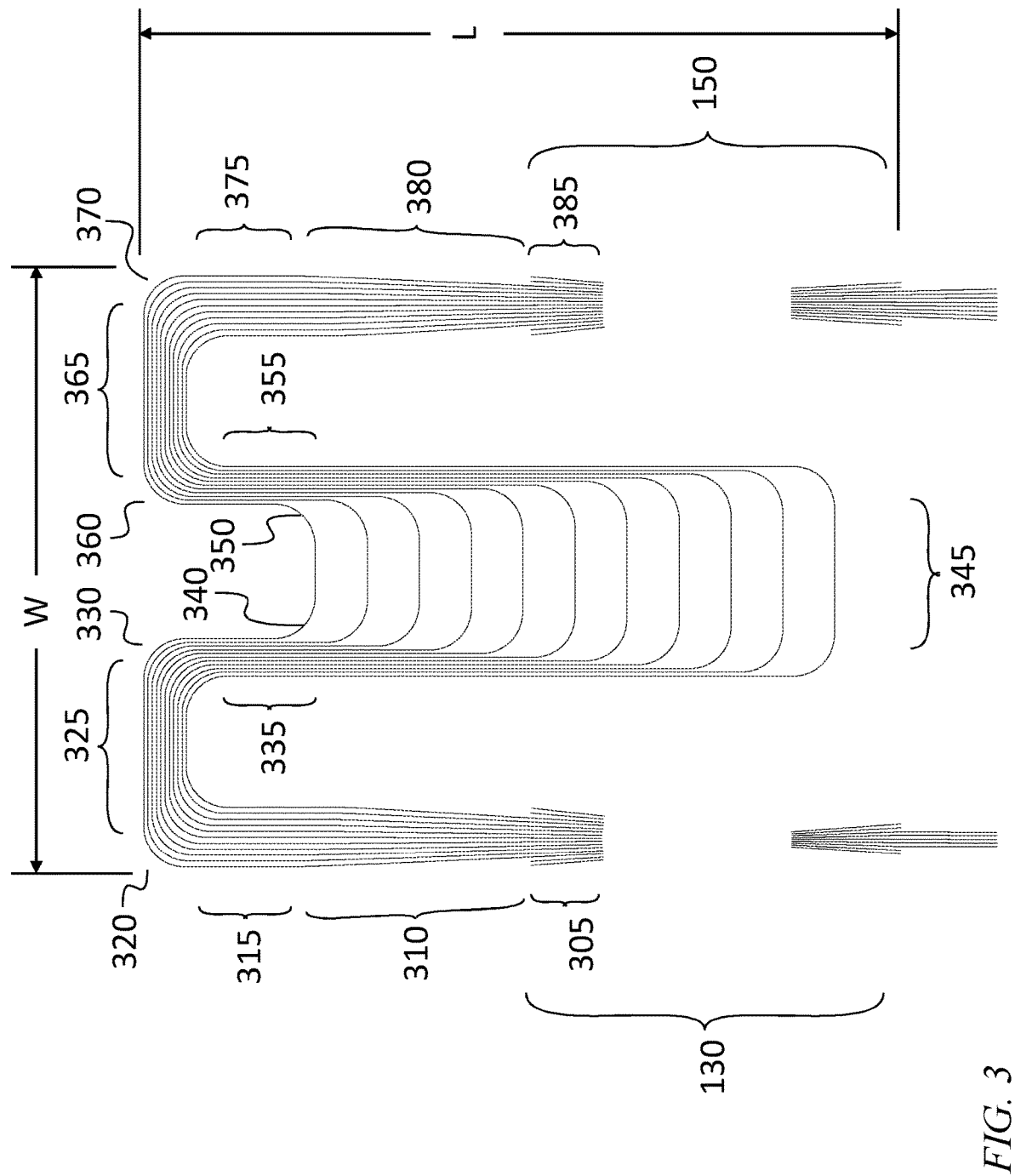
FIG. 3 is a plan view of a T-shaped arrayed waveguide grating, according to an embodiment of the present invention.

Referring to FIG. 3, in some embodiments each waveguide of the array may include, along the waveguide in a direction from the first star coupler to the second coupler, a first straight section 305 (inside an aperture of the first star coupler 130), a first curved section 310, a second straight section 315, a first clockwise bend 320, a third straight section 325, a second clockwise bend 330, a fourth straight section 335, a first counterclockwise bend 340, a fifth straight section 345, a second counterclockwise bend 350, a sixth straight section 355, a third clockwise bend 360, seventh straight section 365, a fourth clockwise bend 370, a eighth straight section 375, a second curved section 380, and a ninth straight section 385 (inside an aperture of the first star coupler 130).

As such, each waveguide of the array may include four clockwise bends and two counterclockwise bends, along the waveguide in a direction from the first star coupler to the second coupler, or, equivalently, each waveguide of the array may include four counterclockwise bends and two clockwise bends, along the waveguide in a direction from the second star coupler to the first coupler. In some embodiments some of the straight sections may be absent. For example, the third straight section 325 and the seventh straight section 365 may be absent for the innermost waveguide, and/or the fifth straight section 345 may be absent for the outermost waveguide.

A "bend" or a "curved section" as used herein, is a section of waveguide within which the curvature is in one direction, e.g., clockwise when progressing along the wavelength in one direction and counterclockwise when progressing along the wavelength in the opposite direction. Although in general a bend may be referred to as a curved section, and vice versa, the convention herein is to use the term "bend" to refer to sections of waveguide having a relatively short radius of curvature (e.g., less than 200 microns) and resulting in a significant change in direction (e.g., more than 60 degrees, and to use the term "curved section" to refer to sections of waveguide having a relatively long radius of curvature (e.g., between 0.5 mm and 20 mm) and resulting in a relatively small change in direction (e.g., less than 10 degrees).

Bends may be counted according to the total amount of direction change. For example, a sharply curved portion of the waveguide in which the direction changes by 180 degrees may be referred to as a single 180 degree bend, or, equivalently, as two 90 degree bends. Two sharply curved portions, separated by a straight section, may be referred to as two 90 degree bends if the direction change in each of them is 90 degrees, or they may be referred to as a single 180 degree bend. Each straight section may have a curvature of less than 0.01/mm. In some embodiments each bend of each waveguide is substantially identical to the corresponding bends of all of the other waveguides of the array, so that phase effects of the bends are common mode and the phase differences between the waveguides are due only to length differences. In some embodiments all of the clockwise bends have a first shape, and all of the counterclockwise bends have a second shape. In some embodiments each counterclockwise bend has a shape that is a mirror image of the shape of each of the clockwise bends.

The entire structure may be compact, having an overall length L, and an overall width W, as shown, and occupying an effective chip area of L×W. W may be between 1.5 mm and 14 mm, or, in some embodiments, between 3 mm and 7 mm, and L may be between 4 mm and 28 mm or, in some embodiments, between 8 mm and 14 mm. The effective chip area may be between 6 mm² and 35 mm². For example, in one embodiment, an arrayed waveguide grating with 24 channels and a channel spacing of 100 GHz has dimensions of 3 mm×8 mm. In another embodiment, an arrayed waveguide grating with 48 channels and a channel spacing of 100 GHz has dimensions of 7 mm×14 mm.

Figure 4A:
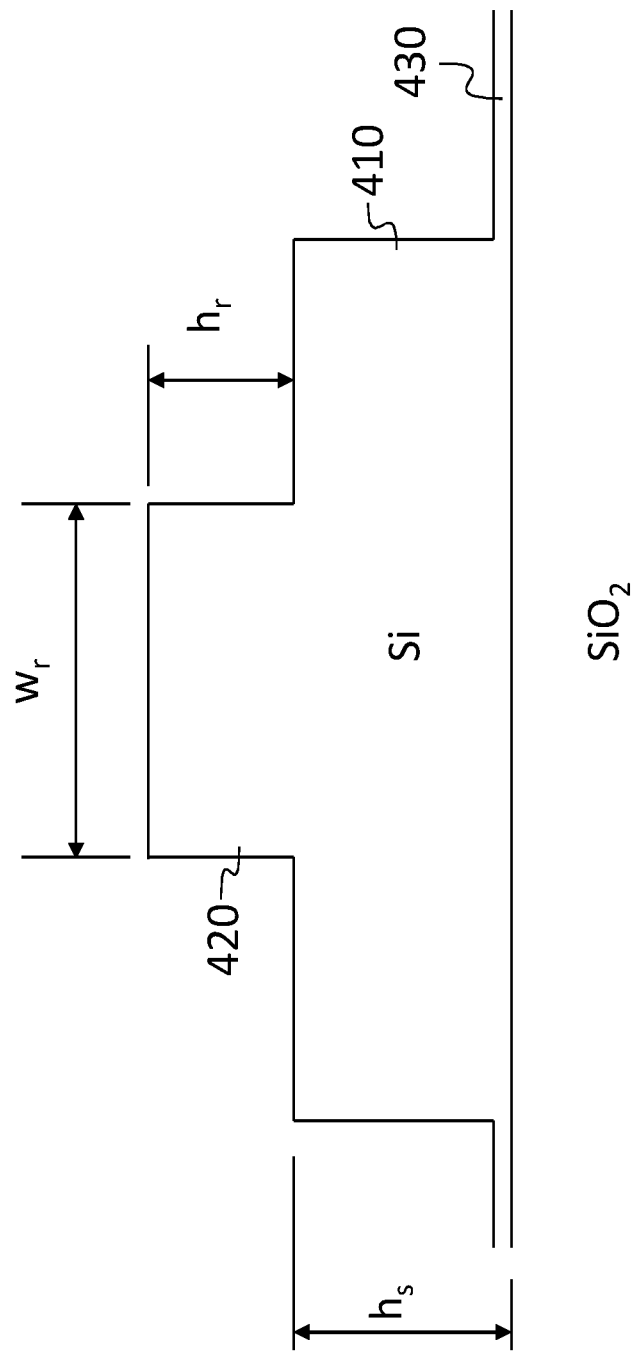
FIG. 4A is a cross section of a rib waveguide, according to an embodiment of the present invention.

In some embodiments, each of the waveguides of the waveguide array is a rib waveguide along one or more portions of its length. Referring to FIG. 4A, the waveguide may be fabricated as a silicon on insulator (SOI) structure, in which a layer of silicon (Si) 3 microns thick, on a layer of silicon dioxide ($SiO_2$) (which may be referred to as "buried oxide" or "BOX" layer) is etched to form a slab portion 410 and a rib portion 420 extending above the slab portion 410. In one embodiment, the width $w_r$ of the rib is 3.0 microns, the height $h_r$ of the rib is 1.2 microns, and the height $h_s$ of the slab is 1.8 microns. A thin (e.g., 0.2 micron thick) layer 430 of silicon may remain on the silicon dioxide in regions on both sides of the slab, for fabrication purposes; this layer may have a negligible effect on the optical characteristics of the waveguide. Adjacent waveguides in the waveguide array 120 may share a slab portion 410 (as shown in FIG. 4C).

Each waveguide may have a rib cross section in the curved sections 310, 380. The curved rib waveguide may shed higher order modes (i.e., confine them sufficiently poorly that their attenuation within these portions is great, e.g., more than 1000 dB/cm), and as a result any light coupled into the bends 320, 370 adjacent to the curved sections 310, 380 may be substantially entirely in the fundamental modes.

Figure 4B:
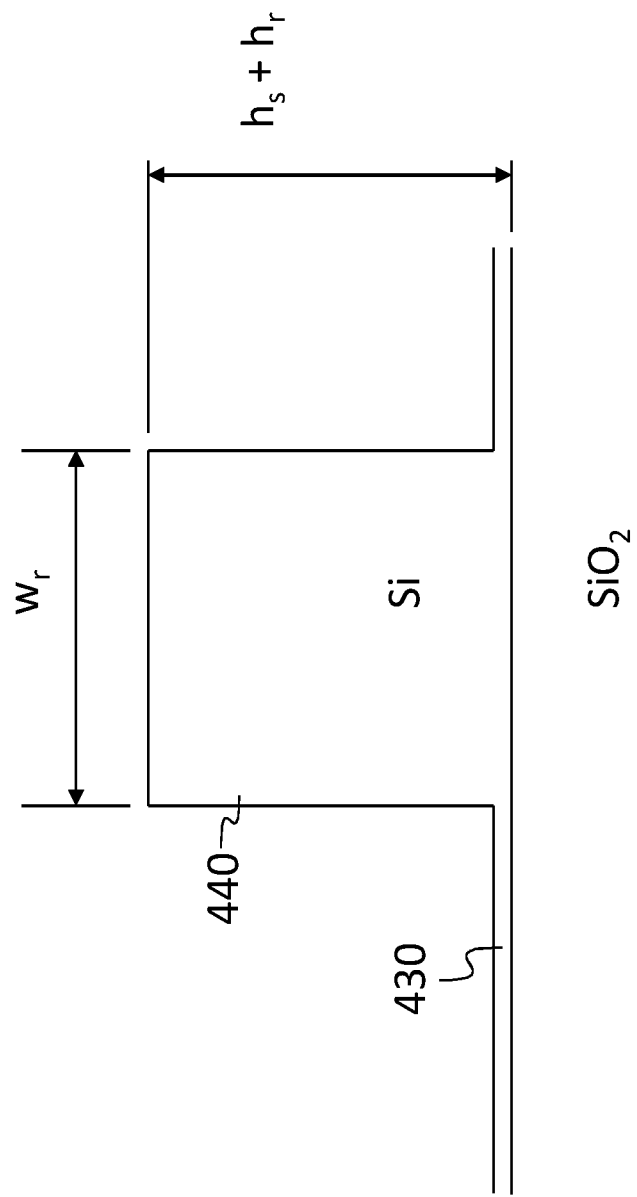
FIG. 4B is a cross section of a strip waveguide, according to an embodiment of the present invention.
Figure 4C:
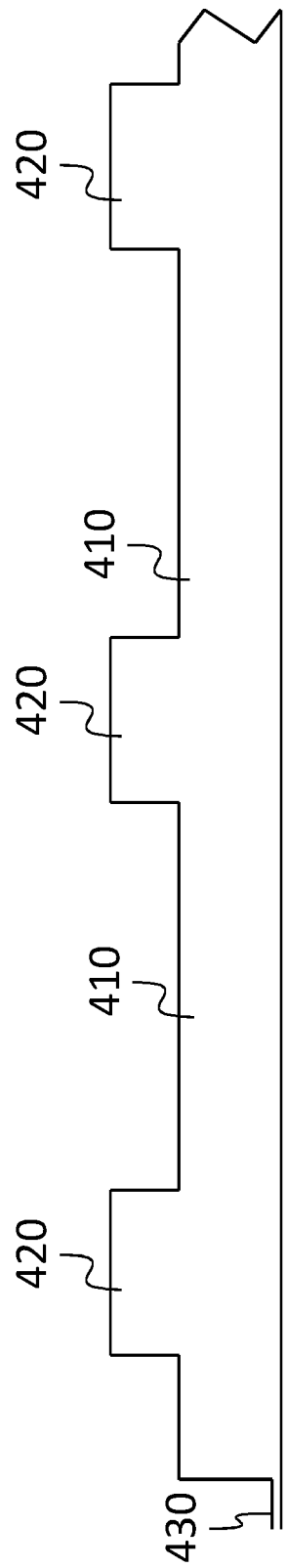
FIG. 4C is a cross section of a portion of an array of rib waveguides on a shared slab, according to an embodiment of the present invention.

Within the bends, and within the straight sections 325, 335, 345, 355, 365, the waveguides may be strip waveguides, as illustrated in FIG. 4B, including a strip 440 and lacking a slab portion. The strip may have a height equal to the combined height of slab portion 410 and rib portion 420, i.e., a height of $h_s+h_r$. The strip waveguides may be suitable for forming tight (<200 micron, or even tighter) bend radii without unacceptable optical loss and with minimal coupling from the fundamental modes into higher order modes. They may also be multi-mode waveguides.

Tapering, i.e., gradual changes in the cross section along the length of the waveguide, may be used to transition between rib and strip waveguides, and to transition to wide rib cross sections that may provide improved coupling to the free propagation regions of the star couplers 130, 150. Each transitions between rib waveguides strip waveguides may be referred to as a "rib to strip converter", having a "rib end" connected to a rib waveguide, and a "strip end" connected to a strip waveguide. Each rib to strip converter may include a region in which the slab portion 410 of each of the rib waveguides tapers to become progressively narrower until it is the same width as the corresponding rib portion 420 and is no longer distinct from the rib portion 420. To the extent that higher order modes are suppressed by the curved portions 310, 380, and that the rib to strip converters do not couple light into higher order modes, the light coupled into the strip waveguides of the bends may be entirely in the fundamental modes.

Figure 4D:
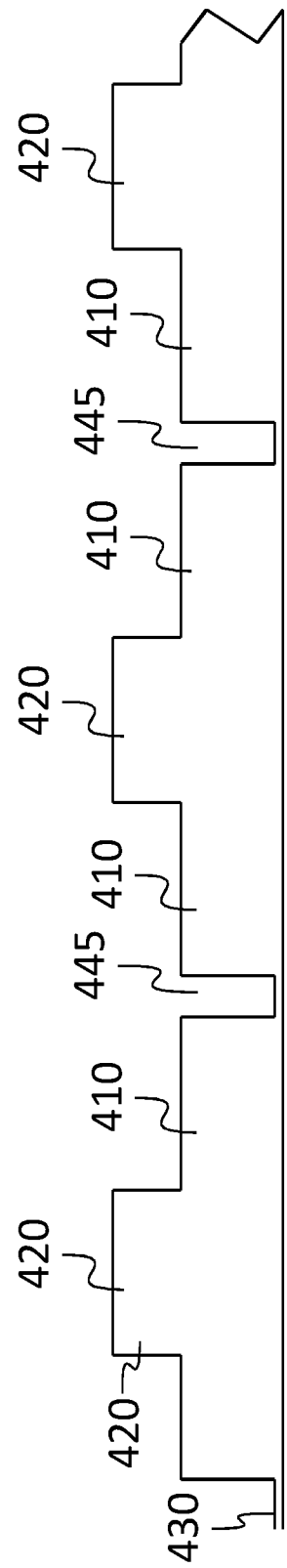
FIG. 4D is a portion of a cross section of a rib to strip converter, according to an embodiment of the present invention.

FIG. 4C shows a cross section of a portion of the waveguide array on the rib end of a rib to strip converter. In the embodiment of FIG. 4C, the rib waveguides share a slab portion 410. FIG. 4D shows a cross section of a portion of the waveguide array at a point within the rib to strip converter. A trench 445 that extends nearly to the bottom of the slab portion, half-way between each pair of adjacent ribs, begins at the rib end of the rib to strip converter and then widens in the direction of the strip end of the rib to strip converter.

Each waveguide of the waveguide array may have a curvature that is adiabatic along the length of the waveguide, i.e., a rate of change of curvature that does not exceed a set value, e.g., a value in a range from $1/mm^2$ to $20/mm^2$, e.g., $5/mm^2$, $10/mm^2$, or $15/mm^2$. As used herein, the "curvature" of the waveguide is the reciprocal of the radius of curvature. For example, portions (such as the curved sections 310, 380, and the bends 320, 330, 340, 350, 360, 370) of each waveguide of the waveguide array may have the shape of a portion of an Euler spiral, which follows a curve for which the rate of change of curvature with distance along the curve is constant. For example, a curved portion of a waveguide of the waveguide array may have the shape of an Euler arc, which consists of two symmetric portions of an Euler spiral. As used herein, an "Euler arc" (or "Euler bend") is symmetric about its midpoint, has a curvature that is greatest at its midpoint and vanishes at each of the two ends of the Euler arc, and that changes at a constant rate in each half of the Euler arc, the rate of change of curvature being equal in magnitude, and opposite in sign, in the two halves of the Euler arc. The term "Euler curve" is used herein to refer to any portion, of an Euler spiral, that has a vanishing curvature at one end.

The absence of discontinuities in the curvature of the waveguide may prevent coupling into higher order modes that otherwise may occur at such a discontinuity. Moreover, as mentioned above, a curved section of rib waveguide (as, e.g., the curved sections 310, 380) may act as a mode filter, effectively confining only the fundamental (TE0 and TM0) modes.

Waveguides fabricated using photolithography or other fabrication techniques employed to fabricate photonic integrated circuits may have walls with small-scale (e.g., nm-scale) roughness. This roughness may result in each wall of the waveguide having a local curvature, on a small scale, that is relatively large and fluctuates significantly along the length of the waveguide. This local roughness, however, may have relatively little effect on the propagation of light in the waveguide, and on the coupling between fundamental modes and leaky higher order modes. Accordingly, the curvature of a waveguide (as distinct from the local curvature of a wall of the waveguide) is defined herein as the curvature of that would be measured if the small-scale roughness of the waveguide is disregarded. The curvature of a waveguide may be measured, for example, with an optical microscope, which may be insensitive to features (such as waveguide wall roughness) that are significantly smaller than the wavelength of visible light.

Although a 5×8 arrayed waveguide grating is illustrated in FIG. 3, having 5 waveguides at the external end of the first star coupler 130 and 8 waveguides at the external end of the second star coupler second, other embodiments may be fabricated in an analogous manner to be M×N arrayed waveguide gratings, having M first waveguides and N second waveguides, with M and N having integer values that may differ from 5 and 8 respectively, and may be as small as 1. Similarly, further embodiments may be fabricated to be cyclic N×N arrayed waveguide gratings or non-cyclic N×N arrayed waveguide gratings. Embodiments of the invention may be fabricated in any high index contrast system suitable for forming tight 90 degree bends, e.g., silicon on insulator (SOI), indium phosphide (InP), or silicon nitride/silicon dioxide ($SiN/SiO_2$).

Figure 5:
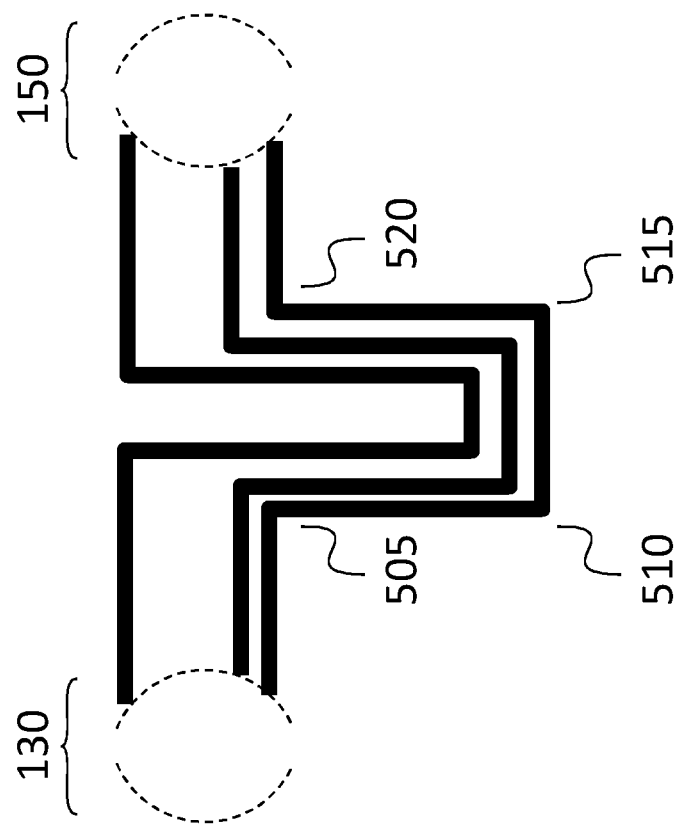
FIG. 5 is a schematic drawing of a T-shaped arrayed waveguide grating, according to an embodiment of the present invention.
Figure 6B:
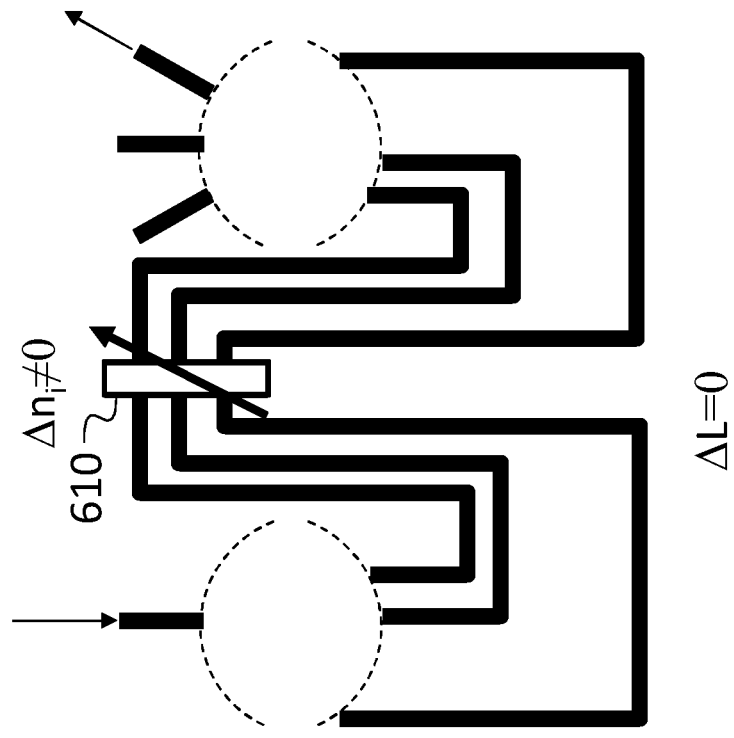
FIG. 6B is a schematic drawing of a tunable T-shaped arrayed waveguide grating, according to an embodiment of the present invention.
Figure 6A:
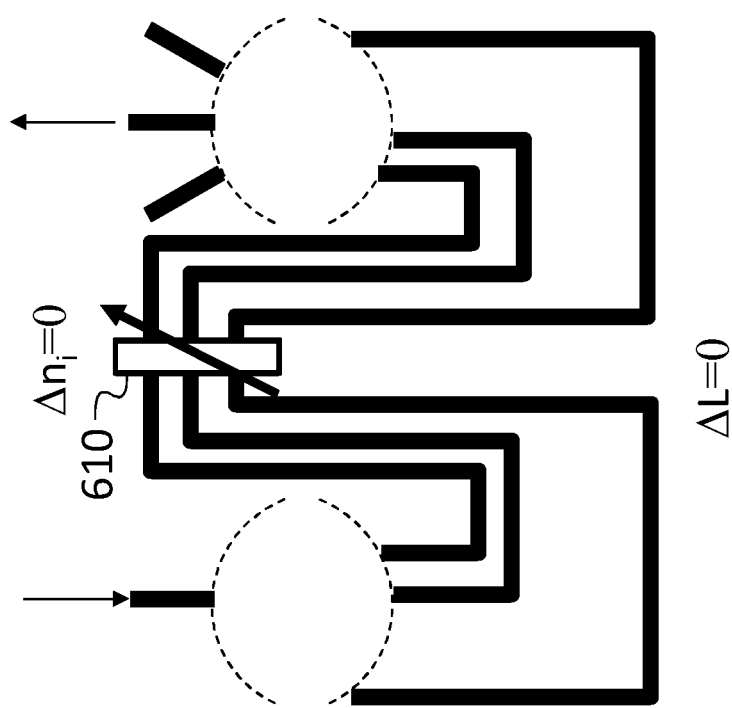
FIG. 6A is a schematic drawing of a tunable T-shaped arrayed waveguide grating, according to an embodiment of the present invention.

FIG. 5 shows a schematic view of a T-shaped arrayed waveguide grating that lacks the two outermost bends (e.g., that lacks the first and fourth clockwise bends 320, 370) of the embodiment of FIG. 3, but is otherwise analogous. FIGS. 6A and 6B show a tunable T-shaped arrayed waveguide grating including a tuning section 610. In the tuning section 610, each waveguide of a subset of the waveguides (the subset either including all of the waveguides, or being a proper subset, and including, e.g., all but one of the waveguides) includes a waveguide section within which the effective index of refraction may be adjusted, e.g., using temperature tuning (using an individual heater on each waveguide or a global heater with gradient heat profile) or using a phase modulator in each waveguide of the subset. In this manner, if the lengths of the waveguides are all the same, then when the tuning section 610 is adjusted so that all of the waveguide sections have the same effective index of refraction (so that the effective lengths are also all the same, i.e., the effective length difference is zero for any pair of waveguides), monochromatic light fed into the central input will exit from the central output (as shown in FIG. 6A). If the tuning section 610 is adjusted so that the waveguide sections do not all have the same effective index of refraction (e.g., so that there is a difference in effective length, that is the same between any pair of adjacent waveguides), then monochromatic light fed into the central input may exit from another output (as shown in FIG. 6B). A tunable T-shaped arrayed waveguide grating such as that of FIGS. 6A and 6B may also be used as an arrayed waveguide grating with a tunable, and arbitrarily large, free spectral range.

In some embodiments, the shape of the mode propagating in each waveguide is adjusted by an array mode converter, as discussed in further detail below, as the waveguides approach the star coupler, to improve coupling efficiency through the star coupler (i.e., to reduce loss in the star coupler). As is the case in other embodiments described herein, the waveguides and star coupler may be formed of a layer of a first material having a relatively high index of refraction (a "high-index layer") on a layer of a second material having a relatively low index of refraction (a "low-index layer"). For example, the high-index layer may be the upper silicon layer of a silicon on insulator wafer, and the low-index layer may be the buried oxide layer of the silicon on insulator wafer. The high-index layer may have regions of different thickness (e.g., as a result of one or more etching operations), with, for example, stripes of greater thickness forming the rib portions of rib waveguides.

Figure 7:
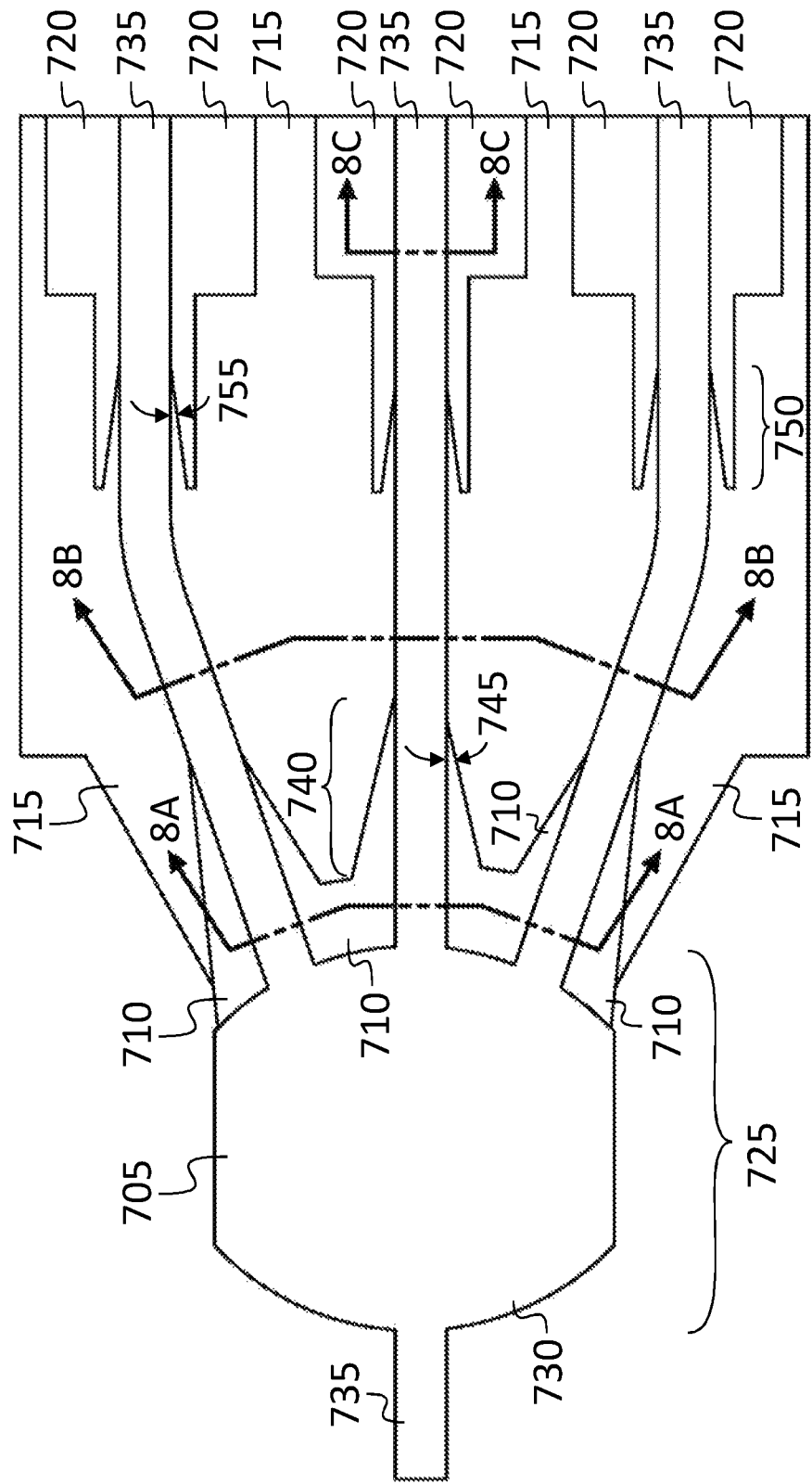
FIG. 7 is a schematic top view of a star coupler and waveguide structure, according to an embodiment of the present invention.

Referring to FIG. 7, in some embodiments, the waveguide structure near a star coupler 725 (which may be employed, for example, as either or both of the first star coupler 130, and the second star coupler 150) and may include four regions 705, 710, 715, 720 each having been etched to a different depth (or not etched) so that the profile of each waveguide changes as it approaches the star coupler. The first region 705, the second region 710, the third region 715, and the fourth region 720 may respectively have a first height H1 above the low-index layer, a second height H2 above the low-index layer, a third height H3 above the low-index layer, and a fourth height H4 above the low-index layer, as illustrated in FIGS. 8A-8C. At and near the star coupler, each waveguide may be a shallow rib waveguide (with, e.g., a rib height of (i.e., a sidewall height of) 0.6 microns), as illustrated in FIG. 8A, which shows a cross-sectional view taken along section line 8A-8A of FIG. 7. Each such waveguide may have a relatively wide optical mode. The width of the trenches between the ribs ("trench width" in FIG. 9C) may be small, (e.g., between 0.1 and 2.0 microns, e.g., 0.6 microns) so that the (relatively wide) modes overlap significantly, for better mode matching to a mode of an output waveguide, as discussed in further detail below. At a greater distance from the star coupler, the waveguide has the shape of a taller, i.e., less shallow rib waveguide as illustrated in FIG. 8B, which shows a cross-sectional view taken along section line 8B-8B of FIG. 7. At a still greater distance from the star coupler (at the strip end of a rib to strip converter) the waveguide has the shape of a strip waveguide as illustrated in FIG. 8C, which shows a cross-sectional view taken along section line 8C-8C of FIG. 7A. As used herein, the height of the rib portion of a rib waveguide, or the "rib height", is (as illustrated in FIG. 4A) the height above the slab portion, or, equivalently, the height of the sidewalls of the rib portion. Features shown as sharp angles in FIG. 7 may be replaced, in a fabrication mask, with rounded features (e.g., rounded features having a radius of curvature 0.3 microns) to improve fabrication repeatability.

In some embodiments, the first region 705 includes the free propagation region 730, and the rib portions of all four waveguides 735, i.e., the rib portions of the three "input" waveguides (on the right hand side of the star coupler in FIG. 7) and the rib portion of the "output" waveguide (on the left hand side of the star coupler in FIG. 7). The waveguides on the right hand side of the star coupler in FIG. 7 are referred to herein as "input" waveguides (and the waveguide on the left hand side of the star coupler in FIG. 7 is referred to herein as an "output" waveguide) for convenience and to describe the operation of the system for light traveling from right to left in FIG. 7. Similarly, the aperture on the right hand side of the star coupler in FIG. 7 is referred to herein as an the "input aperture" for convenience. It will be understood that the star coupler may be a reciprocal device and that analogous features (e.g., a reduction in optical loss) may be achieved for light propagating from left to right in FIG. 7. In some embodiments, the first region 705 has a thickness (from the low-index layer), or a "height above" the low-index layer, of 3 microns.

The second region 710 may include a plurality of portions (e.g., non-contiguous portions), each (i) forming a slab on one side of a waveguide, or (ii) forming a slab on one side of a waveguide and a slab on one side of an adjacent waveguide, as shown. Each slab may include a tapered portion 740, with a first taper angle 745, each tapered portion having a narrow end (at which the slab vanishes, as illustrated in FIG. 7, or at which the width of the slab is small compared to the height and width of the rib) at a first point along the waveguide, and being wider nearer the free propagation region than at the narrow end. FIG. 7 is not to scale and the taper angles are greatly exaggerated so that they are more readily perceptible. The taper angle 745 may be less than 2 degrees, or less than 1 degree. For example, for a taper between rib waveguide sections with different rib dimensions, the taper angle may be about 1/200 radian (0.29 degrees) (e.g., it may be between 1/150 radian and 1/400 radian); for a taper in a rib to strip converter the taper angle may be about 1/50 radian (1.15 degrees) (e.g., it may be between 1/30 radian and 1/100 radian). In some embodiments, the taper angle may be a function of the cross section of the waveguide; for example, a smaller taper angle may be used where the tendency for light to couple into one or more higher order modes is relatively high, and a larger taper angle may be used where the tendency for light to couple into the higher order mode or modes is relatively low. Such an approach may result in a non-linear taper (e.g., a tapered structure in which the taper angle varies along the length of the structure). The height of the second region 710, above the low-index layer, may be 2.4 microns, or approximately 2.4 microns, so that the rib height of rib waveguides bordered by the second region 710 is approximately 0.6 microns, e.g., within 20% of 0.6 microns (e.g., between 0.8×0.6 microns (i.e., 0.48 microns) and 1.2×0.6 microns (i.e., 0.72 microns)). The waveguides and the tapered slabs of the second region 710 together form shallow rib mode converters, in each of which a gradual transition between a first rib waveguide section (e.g., one having a rib height of 1.2 microns) to a second rib waveguide section (e.g., one having a rib height of 0.6 microns) occurs. The taper may be sufficiently gradual that insertion loss caused by the change in waveguide profile is small (e.g., between 0.01 dB and 0.10 dB).

Like the second region 710, the third region 715 may include a plurality of portions (e.g., non-contiguous portions), each (i) forming a slab on one side of a waveguide, or (ii) forming a slab on one side of a waveguide and a slab on one side of an adjacent waveguide, as shown. Also, as in the case of the second region 710, each slab formed by the third region 715 may include a tapered portion 750, with a second taper angle 755, each taper having a narrow end (at which the slab vanishes, as illustrated in FIG. 7, or at which the width of the slab is small compared to the height and width of the rib) at a first point along the waveguide, and being wider nearer the free propagation region than at the narrow end. The taper angle 755 may be less than 3 degrees, or less than 2 degrees, e.g., it may be 1.1 degrees. The height of the third region 715, above the low-index layer, may be 1.8 microns, or approximately 1.8 microns, e.g., within 20% of 1.8 microns.

The fourth region may be a region in which the high-index layer is absent or nearly absent e.g., in which it has a thickness sufficiently small to have little effect on the shape of the fundamental modes of the waveguide. It may have a thickness of less than 0.5 microns, e.g., a thickness of 0.2 microns. As such, waveguide portions that have portions of the fourth region on both sides may be strip waveguides, as illustrated in FIG. 8C.

The fraction of power coupled into the output waveguide may be proportional to an overlap integral between (i) the superposition of modes in the input waveguides at the input aperture of the star coupler 725, and (ii) the mode of the output waveguide at the input aperture. The mode of the output waveguide at the input aperture (which, to the extent the star coupler is a reciprocal device, is the same as the mode shape that light fed into the star coupler through the output waveguide takes at the input aperture) may have an approximately uniform amplitude and an approximately cylindrical wave front (i.e., surface of constant phase) across the set of input waveguides, near the input aperture. As such, if the input waveguide modes are relatively wide and overlapping at the input aperture, the loss may be lower than if each mode is relatively highly confined (i.e., to the rib portion of the respective waveguide) so that there is little overlap. In the latter case, for example, the field pattern, at the input aperture, of the superposition of the light fed into the free propagation region from the input waveguides may have an amplitude varying between a large value at the center of each of the input waveguides and a significantly smaller value at each midpoint between any pair of input waveguides, the overlap integral may be relatively small, and a significant fraction of the light may not be coupled into a fundamental mode (e.g., a TE00 mode or a TM00 mode) of the output waveguide.

Figure 9A:
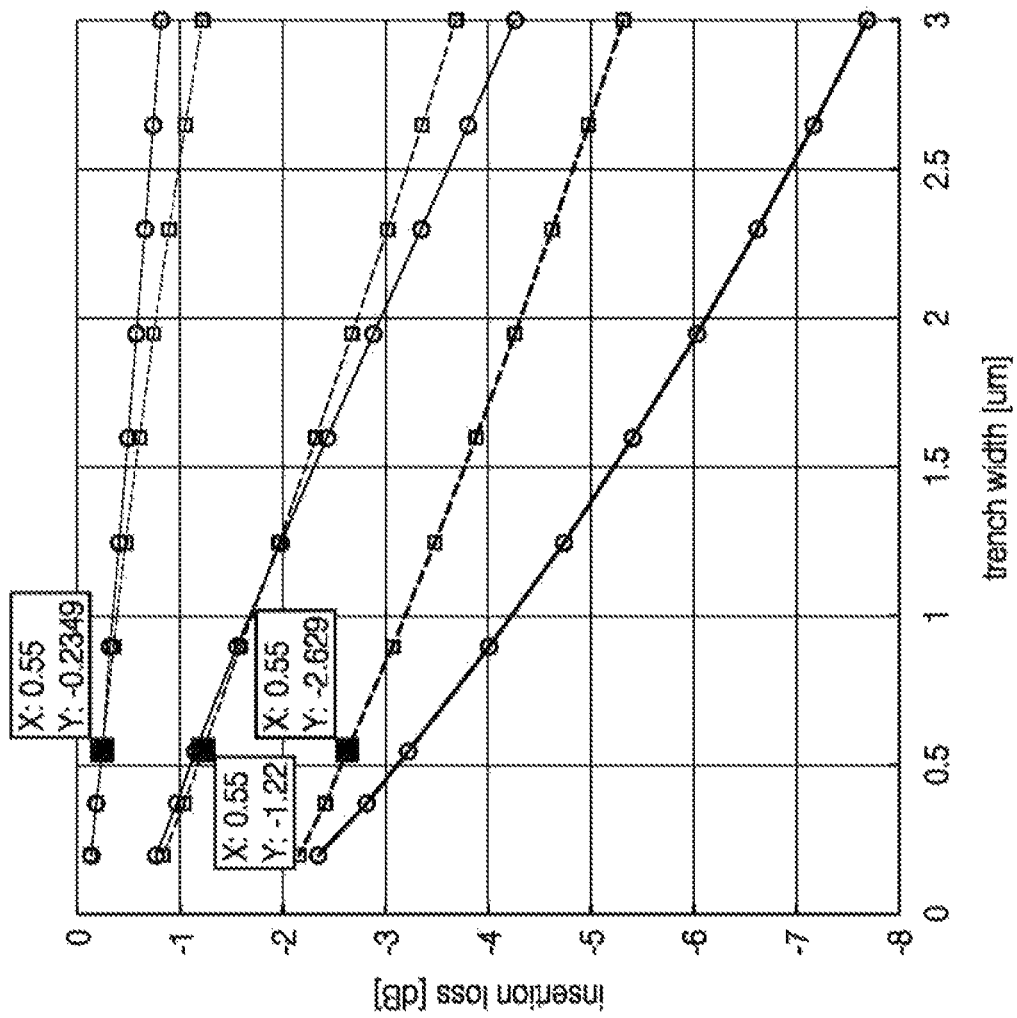
FIG. 9A is a graph of insertion loss as a function of trench width, according to an embodiment of the present invention.
Figure 9B:
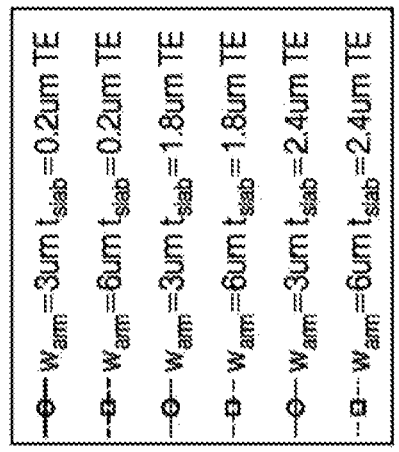
FIG. 9B is a legend for FIG. 9A, according to an embodiment of the present invention.
Figure 9C:
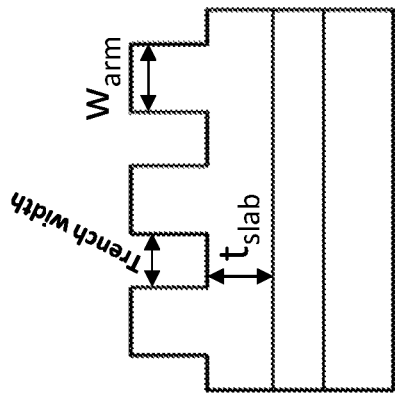
FIG. 9C is an illustration of dimensions for FIG. 9A, according to an embodiment of the present invention.

Wider modes may be achieved, in the input waveguides at the input aperture of the star coupler, by input waveguides that have a profile with a wider rib portion (as mentioned above), or with a shallow rib portion as illustrated in FIGS. 7 and 8A. FIG. 9A shows calculated insertion loss due to mode mismatch for various waveguide geometries at the input aperture of the star coupler (specified in the legend of FIG. 9B, and with the dimensions at issue being illustrated in FIG. 9C). In some embodiments, the overlap integral of (i) a first field pattern, which is a superposition of modes in the input waveguides at the input aperture of the star coupler 725, when the phases in the waveguides are the same at the input aperture (for an output waveguide that is centered, as illustrated, or for phases that change substantially uniformly across the input aperture for an output waveguide that is offset from center), with (ii) a second field pattern, which is the field pattern, at the input aperture, corresponding to the fundamental mode (e.g., the TE00 mode) of the output waveguide, is at least 0.8 times as great as the overlap integral of the first field pattern with itself. As used herein, the "overlap integral" of a first field pattern with a second field pattern over a surface is the integral, over the surface, of the product of the first field pattern and the second field pattern. For the star coupler the ratio of (i) the overlap integral of the first field pattern with the second field pattern and (ii) the overlap integral of the first field pattern with the first field pattern is a good approximation of the fraction of the total optical power in the input waveguides that is coupled into the output waveguide.

It will be understood that the dimensions disclosed herein are examples only and that in some embodiments the dimensions may vary (e.g., by up to 20%) while preserving some or all of the functional features of the embodiments disclosed.

Although exemplary embodiments of a T-shaped arrayed waveguide grating with free propagation region matching have been specifically described and illustrated herein, many modifications and variations will be apparent to those skilled in the art. Accordingly, it is to be understood that a T-shaped arrayed waveguide grating with free propagation region matching constructed according to principles of this invention may be embodied other than as specifically described herein. The invention is also defined in the following claims, and equivalents thereof

What is claimed is:
1. An array mode converter for coupling to a free propagation region of a star coupler, the array mode converter comprising:
   a high-index layer on a low-index layer, the high-index layer having:
      a first region, having a first height above the low-index layer;
      a second region, having a second height above the low-index layer, the second height being less than the first height; and
      a third region, having a third height above the low-index layer, the third height being less than the second height,
   the first region, the second region, and the third region defining a first waveguide,
   the first waveguide having a sidewall height decreasing, with decreasing distance, along the first waveguide, from the free propagation region, to a sidewall height of less than 1.2 microns at the free propagation region, and
   the second region forming a slab on both sides of the first waveguide, the slab having a width, on each side of each sidewall of the first waveguide, tapering, at a taper angle, in a direction, along the first waveguide, of increasing distance from the free propagation region, from a width of more than three microns to a width of less than 0.5 microns, the taper angle being, at a point along a length of the slab, less than 2 degrees.
2. The array mode converter of claim 1, wherein:
   the first region, the second region, and the third region further define a second waveguide; and
   a trench width between the first waveguide and the second waveguide, at the free propagation region, is less than 1.5 microns.

3. The array mode converter of claim 2, wherein a trench width between the first waveguide and the second waveguide, at the free propagation region, is less than 0.7 microns.

4. The array mode converter of claim 1, wherein the first region has a height, above the low-index layer, that is within 20% of 3.0 microns.

5. The array mode converter of claim 4, wherein the second region has a height, above the low-index layer, that is less than the height, above the low-index layer, of the first region, by an amount that is within 20% of 0.6 microns.

6. The array mode converter of claim 1, wherein the third region has a height that is within 20% of 1.8 microns.

7. The array mode converter of claim 1, wherein the taper angle is, at a point along the length of the slab, less than 1 degree.

8. The array mode converter of claim 1, further comprising a fourth region, having a fourth height above the low-index layer, the fourth height being less than the third height.

9. The array mode converter of claim 8, wherein the fourth height is greater than or equal to zero microns and less than 0.5 microns.

10. A star coupler, comprising:
the array mode converter of claim 1;
the free propagation region; and
a second waveguide,
wherein:
the first region, the second region, and the third region define:
an array of first waveguides, including the first waveguide, terminating at a first aperture of the star coupler, each of the first waveguides having a fundamental transverse electric mode, a superposition of the modes defining a first field pattern at the first aperture of the star coupler, and
the second waveguide,
the second waveguide terminates at a second aperture of the star coupler and has a fundamental transverse electric mode defining a second field pattern at the first aperture of the star coupler, and
an overlap integral of the first field pattern with the second field pattern over the first aperture of the star coupler is at least 0.8 times as great as an overlap integral of the first field pattern with the first field pattern.

11. The star coupler of claim 10, wherein each of the first waveguides comprises a shallow rib mode converter forming a transition between a first rib waveguide section and second rib waveguide section, the second rib waveguide section being nearer the star coupler than the first rib waveguide section and having a rib height less than a rib height of the first rib waveguide section.

12. The star coupler of claim 11, wherein the shallow rib mode converter is capable of transforming a fundamental transverse electric mode of the first rib waveguide section to a fundamental transverse electric mode of the second rib waveguide section with a loss of less than 0.5 dB.

13. An arrayed waveguide grating, comprising:
a first star coupler,
a second star coupler,
an array of waveguides connecting the first star coupler and the second star coupler, and
an array mode converter, in the array of waveguides, at the first star coupler,
each of the waveguides having four bends, each of the bends having a change of direction of at least 80 degrees,
wherein a first waveguide of the array of waveguides has, along the first waveguide in a direction from the first star coupler to the second star coupler:
a first clockwise bend,
a first counterclockwise bend following the first clockwise bend,
a second counterclockwise bend following the first counterclockwise bend, and
a second clockwise bend following the second counterclockwise bend, and
wherein the array mode converter comprises:
a high-index layer on a low-index layer, the high-index layer having:
a first region, having a first height above the low-index layer;
a second region, having a second height above the low-index layer, the second height being less than the first height; and
a third region, having a third height above the low-index layer, the third height being less than the second height,
a first waveguide of the array of waveguides having, within the array mode converter, a sidewall height decreasing, with decreasing distance, along the first waveguide, from a free propagation region of the first star coupler, to a sidewall height of less than 1.2 microns at the free propagation region of the first star coupler, and
the second region forming a slab on both sides of the first waveguide, the slab having a width, on each side of each sidewall of the first waveguide, tapering, at a taper angle, in a direction, along the first waveguide, of increasing distance from the free propagation region of the first star coupler, from a width of more than three microns to a width of less than 0.5 microns, the taper angle being, at a point along a length of the slab, less than 2 degrees.

14. The array mode converter of claim 13, wherein a trench width between the first waveguide and a second waveguide of the array of waveguides, at the free propagation region of the first star coupler, is less than 0.7 microns.

15. The array mode converter of claim 13, wherein the second region has a height, above the low-index layer, that is less than the height, above the low-index layer, of the first region, by an amount that is within 20% of 0.6 microns.

16. The array mode converter of claim 13, wherein the taper angle is, at a point along the length of the slab, less than 1 degree.

17. The array mode converter of claim 13, further comprising a fourth region, having a fourth height, above the low-index layer, the fourth height being less than the third height.

18. The array mode converter of claim 17, wherein the fourth height is greater than or equal to zero microns and less than 0.5 microns.

* * * * *